US012711038B2

(12) United States Patent
Morrison et al.

(10) Patent No.: US 12,711,038 B2
(45) Date of Patent: Aug. 18, 2026

(54) SYSTEMS AND METHODS FOR DETECTING ACCESSIBILITY FAILURES

(71) Applicant: Capital One Services, LLC, McLean, VA (US)

(72) Inventors: Mark Morrison, Plano, TX (US); Tom Vandenberge, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 244 days.

(21) Appl. No.: 18/324,940

(22) Filed: May 26, 2023

(65) Prior Publication Data

US 2024/0394170 A1 Nov. 28, 2024

(51) Int. Cl.
*G06F 11/3604* (2025.01)
*G06F 8/10* (2018.01)

(52) U.S. Cl.
CPC ............ *G06F 11/3604* (2013.01); *G06F 8/10* (2013.01)

(58) Field of Classification Search
None
See application file for complete search history.

(56) References Cited

U.S. PATENT DOCUMENTS 6,889,337 B1 * 5/2005 Yee ..................... G06F 11/3688 717/124
10,459,835 B1 * 10/2019 George ................. G06F 16/906
10,839,039 B1 * 11/2020 Wiley ................... G06F 16/957
2014/0280193 A1 * 9/2014 Cronin ................ G06F 16/2228 707/741
2018/0203674 A1 * 7/2018 Dayanandan ............. G06F 8/35
2020/0372204 A1 * 11/2020 Bradley ................ G06F 40/186
2021/0303447 A1 * 9/2021 Haze .................... G06N 3/0499
2023/0088784 A1 * 3/2023 Negussie ............... G06N 20/00 717/102

(Continued)

OTHER PUBLICATIONS

Abdulaziz Alshayban and Sam Malek. 2022. AccessiText: Automated Detection of Text Accessibility Issues in Android Apps. In Proceedings of the 30th ACM Joint European Software Engineering Conference and Symposium on the Foundations of Software Engineering, Nov. 14-18, 2022, Singapore, 12 pp. (Year: 2022).*

(Continued)

*Primary Examiner* — Andrew M. Lyons
(74) *Attorney, Agent, or Firm* — Foley & Lardner LLP

(57) ABSTRACT

Systems and methods for detecting accessibility failures. In some aspects, the system receives a request for evaluating accessibility for a user interface of an updated version of a software application, wherein the request includes the updated and previous versions of the software application, and previous textual data corresponding to the previous version. The system generates audio output by using a screen reader to process the user interface. Textual data is generated by processing the audio output using speech recognition. The system compares the textual data to previous textual data to determine whether feature differences are present between the updated and previous versions. The one or more feature differences are analyzed to identify a feature difference corresponding to an accessibility failure point. In response to identifying the accessibility failure point, the system determines actions for removing the accessibility failure point.

20 Claims, 7 Drawing Sheets

(56) References Cited

U.S. PATENT DOCUMENTS

| | | | | |
|---|---|---|---|---|
| 2023/0178065 | A1* | 6/2023 | Murugesan | G10L 21/0364 704/260 |
| 2024/0419486 | A1* | 12/2024 | Mohanty | G06N 3/044 |

OTHER PUBLICATIONS

Forough Mehralian, Navid Salehnamadi, Syed Fatiul Huq, and Sam Malek. 2023. Too Much Accessibility is Harmful! Automated Detection and Analysis of Overly Accessible Elements in Mobile Apps. In Proceedings of the 37th IEEE/ACM International Conference on Automated Software Engineering (ASE '22). 13 pp. (Year: 2023).*

* cited by examiner

SYSTEMS AND METHODS FOR DETECTING ACCESSIBILITY FAILURES

SUMMARY

Between fifteen and twenty percent of the population, over one billion people worldwide, are estimated to experience a disability. Disabilities can be physical, sensory, or cognitive. Laws protect people with disabilities in public life, including public architectural standards in new buildings and alterations to buildings to provide access and effective communication for people with hearing, vision, or speech disabilities. Most activity in this space predates the widespread use of digital devices. However, digital accessibility is also important to customers, as is compliance with applicable regulations.

Digital accessibility often relates to an enterprise's website and mobile application. However, many applications were not designed and coded in a manner that accommodates disabilities. At the core, digital accessibility should include or be compatible with software that can read content aloud and include subtitles on videos to address vision and hearing disabilities.

Software development can be an iterative and incremental process that includes planning, coding, function testing, and re-coding. Testing associated with accessibility is often tasked to a person or group, such as an accessibility team, separate from those involved in coding an interface. Accessibility testing can require human involvement, for instance, interpreting audio produced for people with visual impairment. Additionally, waiting weeks or longer to receive results is common. If there are issues with accessibility, changes can be made, and further accessibility testing can be initiated. However, large delays can significantly lengthen the time it takes to make new software or features available.

In some aspects, the systems and methods described herein pertain to detecting accessibility failures. A tool can be provided to developers that identifies accessibility issues automatically. Consequently, developers can remedy issues before initiating formal and separate accessibility testing and thus mitigate delays associated with the accessibility testing. For instance, a user interface can be read by a screen reader, and the audio output can be analyzed to identify issues. Further, an identified issue can be analyzed, and a recommendation generated that remedies the identified issue. An accessibility failure point and remediation recommendation can be returned by the tool for action by a developer. In some embodiments, the remediation recommendation can be automatically implemented. In some embodiments, functionality can be employed proactively to provide feedback to developers in real-time as they write code. The feedback can include potential accessibility issues and optionally recommended action to resolve such issues.

In some aspects, systems and methods for evaluating accessibility of one or more software applications are described. The method may include receiving a request for evaluating accessibility for a user interface of an updated version of a software application, wherein the request comprises (1) the updated version of the software application, (2) a previous version of the software application, and (3) previous textual data corresponding to the previous version of the software application. The method may include generating audio output using a screen reader configured to process textual or visual data of the user interface and the updated version of the software application. The method may include generating textual data by processing the audio output of the user interface using speech recognition. The method may include comparing the textual data to the previous textual data to determine a plurality of feature differences present between the updated version and previous version of the software application. The method may include processing the textual data and the plurality of feature differences using a first machine learning model to identify one or more feature differences of the plurality of feature differences corresponding to unintentional design changes. The method may include analyzing the one or more feature differences to identify a first feature difference corresponding to an accessibility failure point, wherein the accessibility failure point renders content in the user interface of the software application inaccessible to a visually impaired user. The method may include in response to identifying the accessibility failure point, determining, based on (1) the first feature difference, and (2) the updated version of the software application, one or more actions for removing the accessibility failure point.

In some examples, the method may include transmitting, to a remote device, a command for displaying, at a remote device, the one or more actions for removing the accessibility failure point.

In some examples, determining one or more actions for removing the accessibility failure point comprises retrieving, from a data structure, the one or more actions based on (1) the one or more feature differences and (2) the updated version of the software application.

In some examples, the method may include receiving a training dataset comprising (1) a plurality of textual data, (2) a plurality of feature differences, and (3) corresponding indications regarding whether a feature difference corresponds to unintentional or intentional design changes, and training, based on the training dataset, the first machine learning model for identifying accessibility failure points to predict whether feature differences between versions of software applications correspond to unintentional design changes.

In some examples, determining one or more actions for removing the accessibility failure point comprises: processing (1) the one or more feature differences and (2) the updated version of the software application using a second machine learning model for identifying actions for removing the accessibility failure point.

In some examples, the method may include receiving a training dataset comprising (1) the one or more feature differences, (2) the updated version of the software application, and (3) corresponding actions that were performed to remove accessibility failure points, and training, based on the training dataset, the second machine learning model for identifying actions for removing accessibility failure points.

In some examples, the textual data comprises (1) a string of text and (2) one or more timestamps, and wherein generating the textual data comprises generating, for each of a plurality of segments of the string of text, a corresponding timestamp representing a time at which each segment was textualized.

In some examples, the method may include automatically performing the one or more actions for removing accessibility failure points, and transmitting, to a remote device, a notification of successful completion of the one or more actions.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
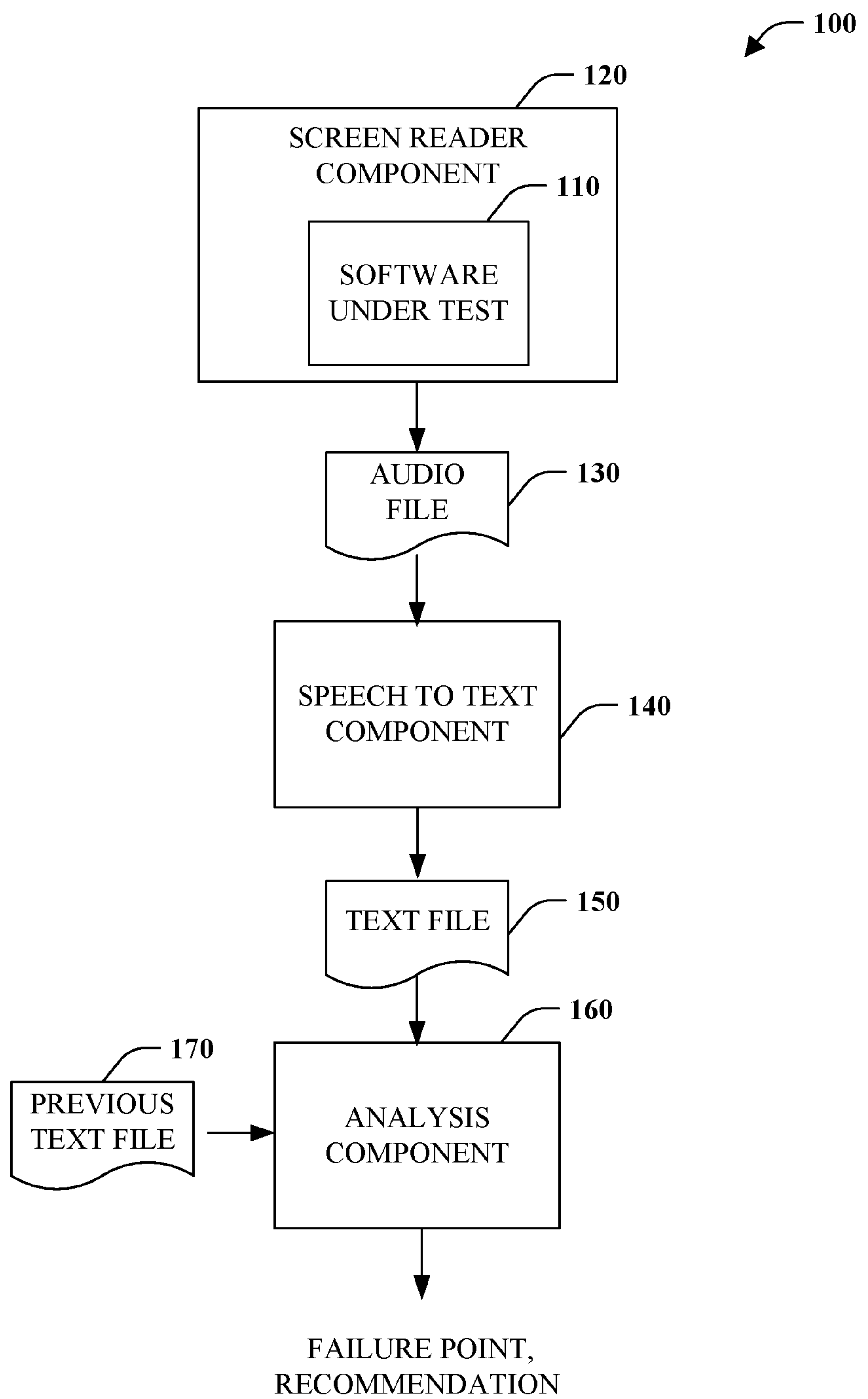
FIG. 1 illustrates a high-level overview of an example accessibility failure detection and remediation system, in accordance with one or more embodiments described herein.

Referring initially to FIG. 1, a high-level overview of an example implementation of a failure detection and remediation recommendation system 100 is depicted. The failure detection and remediation recommendation system 100 includes software under test 110, screen reader component 120, audio file 130, speech-to-text component 140, text file 150, analysis component 160, and previous text file 170.

The software under test 110 can correspond to all or a portion of a software development project. In accordance with one embodiment, the software under the test 110 can include or correspond to a user interface. For example, the user interface can correspond to a web page associated with a software-as-a-service (SAAS) architecture or a mobile application interface.

The screen reader component 120 is configured to render text and image content as speech. The screen reader is an assistive technology that aids people who are visually impaired, illiterate, or have a learning disability. The screen reader component 120 operates over the software under test 110 in the implementation. In addition to or separate from reading content aloud, the screen reader component can output the audio file 130 for subsequent analysis. The audio file 130 includes speech generated from on-screen information, among other things. In one instance, a conventional screen reader can be invoked, and the screen reader component 120 can record the spoken content in the audio file 130. Further, although a single screen reader component is shown, multiple screen reader components can be employed, as screen readers can vary by type of device and operating system, among other things.

The speech-to-text component 140 is configured to recognize speech and translate spoken language into text. The speech-to-text component 140 can receive the audio file 130 output by the screen reader component 120. The speech-to-text component 140 can process the audio file by recognizing and translating the speech to text. The speech-to-text component 140 can also record times that certain actions were performed, among other metadata. The output of the speech-to-text component can be the text file 150.

The analysis component 160 is configured to identify an accessibility failure point and generate a remediation recommendation. The analysis component 160 receives the text file 150 as input. Additionally, the analysis component 160 can receive a previous version of the text file, a corresponding version of the software under test 110, or both. The previous version can correspond to a benchmark sometimes referred to as a golden benchmark, which may refer to a standard or reference point against which other versions can be compared. The previous version may be used to validate accuracy or performance of the updated version. The analysis component 160 can determine the difference between previous and current versions. For example, a comparison between the text file 150 and a corresponding text file of another version or benchmark can be made.

The analysis component 160 can next determine whether the difference is expected or unexpected, or, in other words, is intentional or unintentional. An expected difference is likely or anticipated, given a particular change. For example, suppose a change adds a new button to an interface. The presence of the button is expected, even though the addition of the button differs from the prior version. An unexpected difference is not expected or anticipated. For instance, consider a change in a button name that results in the button moving or being hidden. This result is unexpected, given the nature of the change. The analysis component 160 can output differences and highlight or draw attention to unexpected or unintentional differences.

The analysis component 160 can also be configured to generate a remediation recommendation. In other words, a fix can be determined and recommended to address an unexpected difference. The analysis component 160 can analyze an unexpected difference and determine additional changes that can be made to eliminate or remediate the unexpected difference. Consider the above example, in which the name of a button was changed, but unexpectedly the button is gone or invisible. Code can be analyzed, and it can be determined that a portion of code corresponding to the button was commented out. The analysis component 160 can output a fix as a recommendation to a user. For example, the recommendation would be to remove a portion of code from a comment. Additionally, a recommendation can be accepted and automatically implemented in response to instructions from a user as well as others (e.g., supervisor, teammates).

Figure 2:
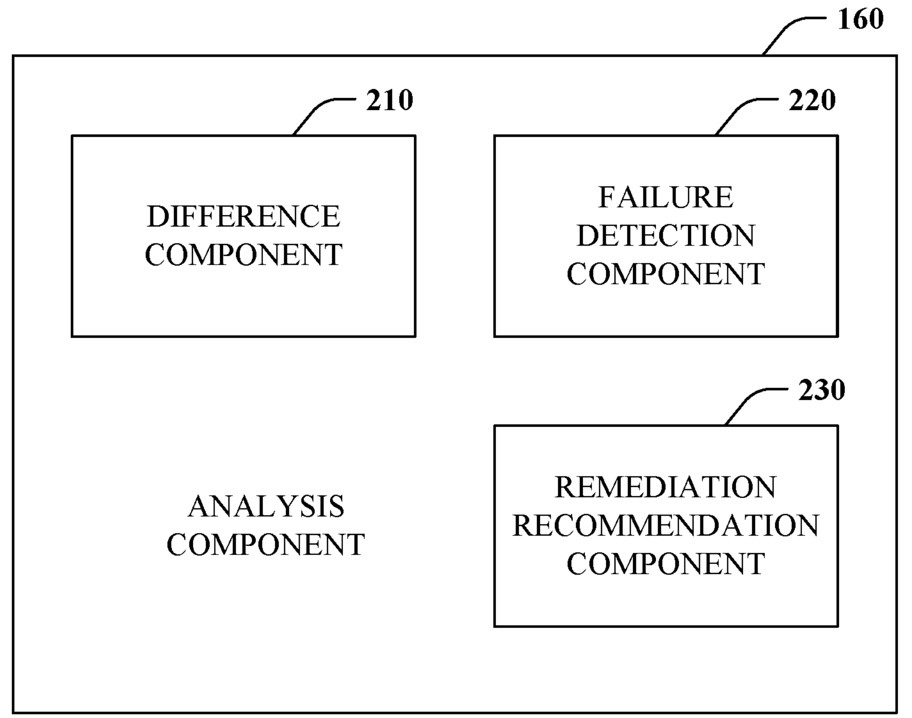
FIG. 2 is a block diagram of an example analysis component, in accordance with one or more embodiments described herein.

Turning attention to FIG. 2, the analysis component 160 is illustrated in further example detail. The analysis component 160 includes difference component 210, failure detection component 220, and remediation recommendation component 230. The difference component 210, failure detection component 220, and remediation recommendation component 230 can be implemented by at least one processor coupled to a memory that stores instructions that cause the processor to perform the functionality of each component when executed. Consequently, a computing device can be configured as a special-purpose device or appliance that implements the functionality of the analysis component 160. Further, all or portions of the analysis component 160 can be distributed across computing devices or made accessible by way of a network service.

The difference component 210 is operable to determine the difference between at least two files or sources of data. The difference component 210 can compare the content of a first file to the content of a second file and output portions that are different. In one implementation, the difference component 210 can determine the difference between a first text file and a second text file, wherein the first text file captures audio from a screen reader, and the second text file is a version of the audio before changes are made. In other words, the second text file can correspond to a benchmark, or golden benchmark, prior to changes, updates, or other alterations. The difference component 210 can also operate over the source code of a software application. Accordingly, the difference component 210 can compare source code associated with an unmodified software application, or a portion thereof, with a modified software application. The difference component 210 can output lines of code that are different.

The failure detection component 220 can be configured to detect or otherwise identify a failure associated with accessibility. There can be many types and specific accessibility failures. For example, a screen reader can utilize hypertext transfer protocol (HTTP) tags to identify information that should be read aloud. A text file that captures audio indicates what information, word, or phrase is spoken. If the text file indicates that a word or phrase is spoken more than once, this could indicate an accessibility failure. The failure detection component 220 can utilize the difference information provided by the difference component 210 as a basis for detecting a failure. For instance, in the above example, the text file can be analyzed, and a failure is identified when spoken text is repeated more than once.

In another instance, metadata can be employed by the failure detection component 220 to detect an accessibility failure. For example, timestamps can be associated with text representing the time the text was read aloud. The difference component can identify a difference between when the information was spoken and when the same information was presented in a benchmark text file. The failure detection component 220 can then identify an accessibility failure based on a time difference.

Of course, situations can occur in which it is unclear whether or not an accessibility failure is present based on the differences between text files associated with spoken or visualized information. For example, changes, updates, upgrades, or other alterations to a program can result in differences between a current text file and a benchmark text file. Accordingly, the failure detection component 2200 can be configured to differentiate between expected or intentional and unexpected or unintentional changes. The difference component 210 can be executed over code to determine the changes made to the code. From the changes, the failure detection component 220 can determine or predict changes to a user interface and, thus, changes in a text file. Determined or predicted text file changes can be compared to actual text file changes to classify the changes as expected or intentional, or unexpected or unintentional. Changes that are anticipated, given the changes to the code, can be classified as expected or intentional. By contrast, unanticipated changes in light of the changes to the code can be classified as unexpected or unintentional. Unexpected changes can be deemed a potential failure detected by the failure detection component 220.

In one embodiment, the failure detection component 220 can correspond to a machine learning model. The machine learning model can be trained on data associated with accessibility failures. When invoked, the machine learning model can automatically infer or predict an accessibility failure. In one instance, the machine learning model can output a probability that the code changes cause an accessibility failure. Furthermore, the same machine learning model or a different machine learning model can be trained to classify changes as expected or unexpected automatically.

The remediation recommendation component 230 can be configured to determine or predict a strategy or set of one or more actions that remediate a failure identified by the failure detection component 220. In one embodiment, remediation can be predetermined and, for instance, available to be looked up by the remediation recommendation component 230. For example, an identified failure "X" can be used as an index to look up remediation actions "A" and "B" in a table that remedy the failure "X." In another embodiment, the remediation action can be determined or predicted based on historical actions that have been used to remediate a failure with similar features. For example, a machine learning model can be trained to predict remediation, given code and text file differences. A predetermined threshold can be employed to identify a remediation strategy. For example, a remediation strategy can be identified as such when the remediation strategy satisfies the predetermined threshold in terms of the probability that the strategy remedies a failure. Regardless of the determination embodiment, the remediation strategy or actions can be transmitted for display to a user, or programmer, by the remediation recommendation component 230. In one instance, the remediation recommendation component 230 can provide an option to trigger automatic implementation of a recommended remediation strategy. Alternatively, a user can reject or manually implement all or portions of the recommendation.

Figure 3:
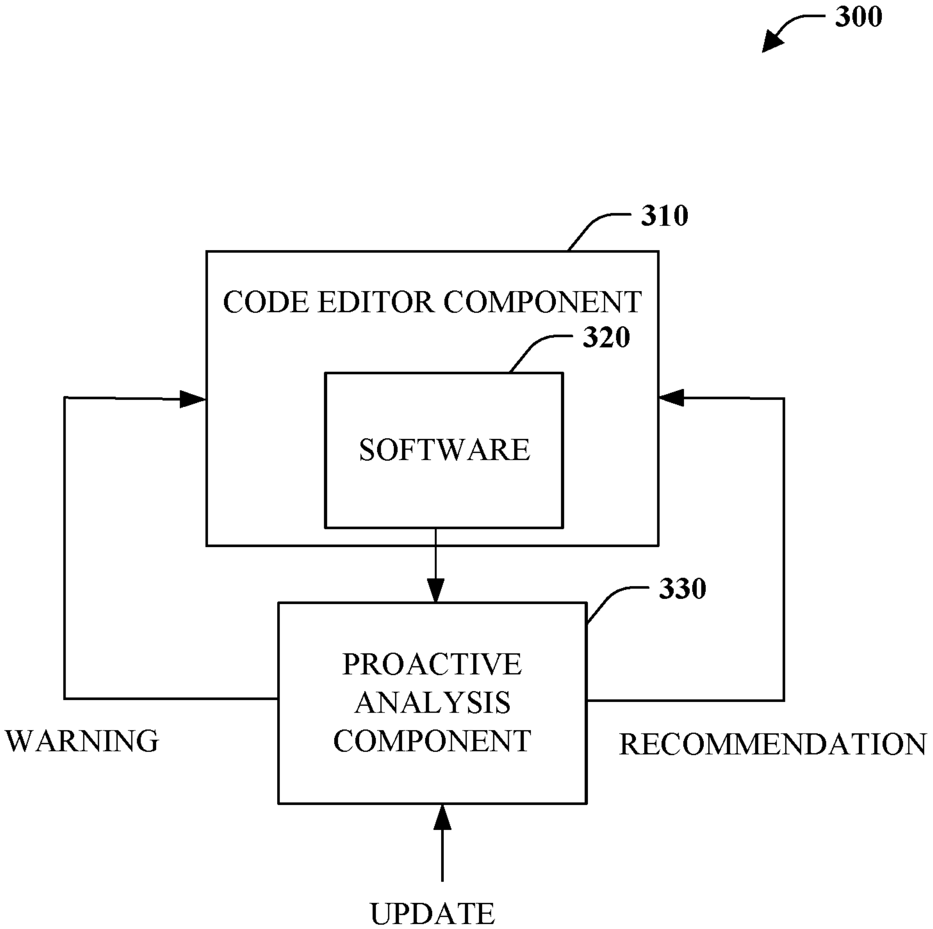
FIG. 3 is a block diagram of an example programming assistance system with proactive failure detection and remediation recommendation, in accordance with one or more embodiments described herein.

FIG. 3 depicts a programming assistance system 300. The programming assistance system 300 is operative to aid programmers in identifying and remedying potential accessibility issues in real-time or near real-time. The programming assistance system 300 comprises code editor component 310, software 320, and proactive analysis component 330.

The code editor component 310 can be configured to provide a mechanism for entry and editing program source code. For example, the code editor can allow text entry of source code. The code editor component 310 can be a standalone application or built into an integrated development environment. Unlike another application that merely supports text editing, the code editor component 310 can include syntax highlighting, indentation, and automatic completion to simplify and expedite source code entry.

The software 320 is opened by the code editor component 310. In other words, the software 320 is displayed and editable within the code editor component 310. The software 320 can correspond to an incomplete or earlier version of the software under test 110 in FIG. 1. The software 320 can correspond to all or a portion of a software development project. In accordance with one embodiment, the software 320 can correspond to a user interface, such as a web page associated with an SAAS architecture or a mobile application interface.

The proactive analysis component 330 is operable to receive and monitor the software 320 as it is input by a programmer in the code editor component 310. Moreover, the proactive analysis component 330 can analyze the software 320 for potential accessibility issues. For example, the proactive analysis component 330 can identify code segments that are known or likely to result in an accessibility issue or failure. Accessibility issues can include, but are not limited to, repetition or not reading something on a screen. In one instance, a machine learning model can be trained on code identified with an accessibility failure and code without failure from historical test results. The proactive analysis component 330 can interact with the code editor component 310 to warn that a segment or portion of code is or may be associated with an accessibility failure. The code editor component 310 can then highlight the identified segment in a manner that indicates an accessibility issue.

If a code segment is identified as an accessibility issue or failure point, the proactive analysis component 330 can seek to identify a remedy. In one scenario, for example, remedies for particular failures can be known and looked up in a database. Additionally, or alternatively, a machine learning model can be trained to identify or generate a unique remedy based on historical accessibility issues, features thereof, and remedies. Remedies can be classified based on known or likely effectiveness. A remedy with effectiveness that satisfies a predetermined threshold can be provided to code editor component 310, which can notify a program of a potential remedy to an identified accessibility issue, for example, in a remediation recommendation. Further, proactive analysis component 330 can provide several possible solutions, such as the top five most likely remedies.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Furthermore, one or more components and/or sub-components can be combined into a single component to provide aggregate functionality. Communication between systems, components, or sub-components can be accomplished following either a push or pull control model. The components can also interact with one or more other components not specifically described herein for the sake of brevity, but known by those skilled in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes, thereby making portions of the systems and methods more adaptive as well as efficient and intelligent. By way of example, and not limitation, the analysis component 160 and proactive analysis component 330 or components thereof can employ such mechanisms to predict accessibility failures and remedies for identified failures. For instance, a machine learning model can be trained to analyze differences in code and text reader output and identify a difference that is likely associated with an accessibility failure. In one embodiment, the machine learning model can classify differences as expected or unexpected, wherein the unexpected differences are likely a result of an accessibility failure or issue. Further, a machine learning model can be trained to identify a remedy for an accessibility failure point based on historical remedies to accessibility issues. In other words, a machine learning model can be employed to perform a root cause analysis of an accessibility failure and recommend a remedy to cure the failure.

Figure 4:
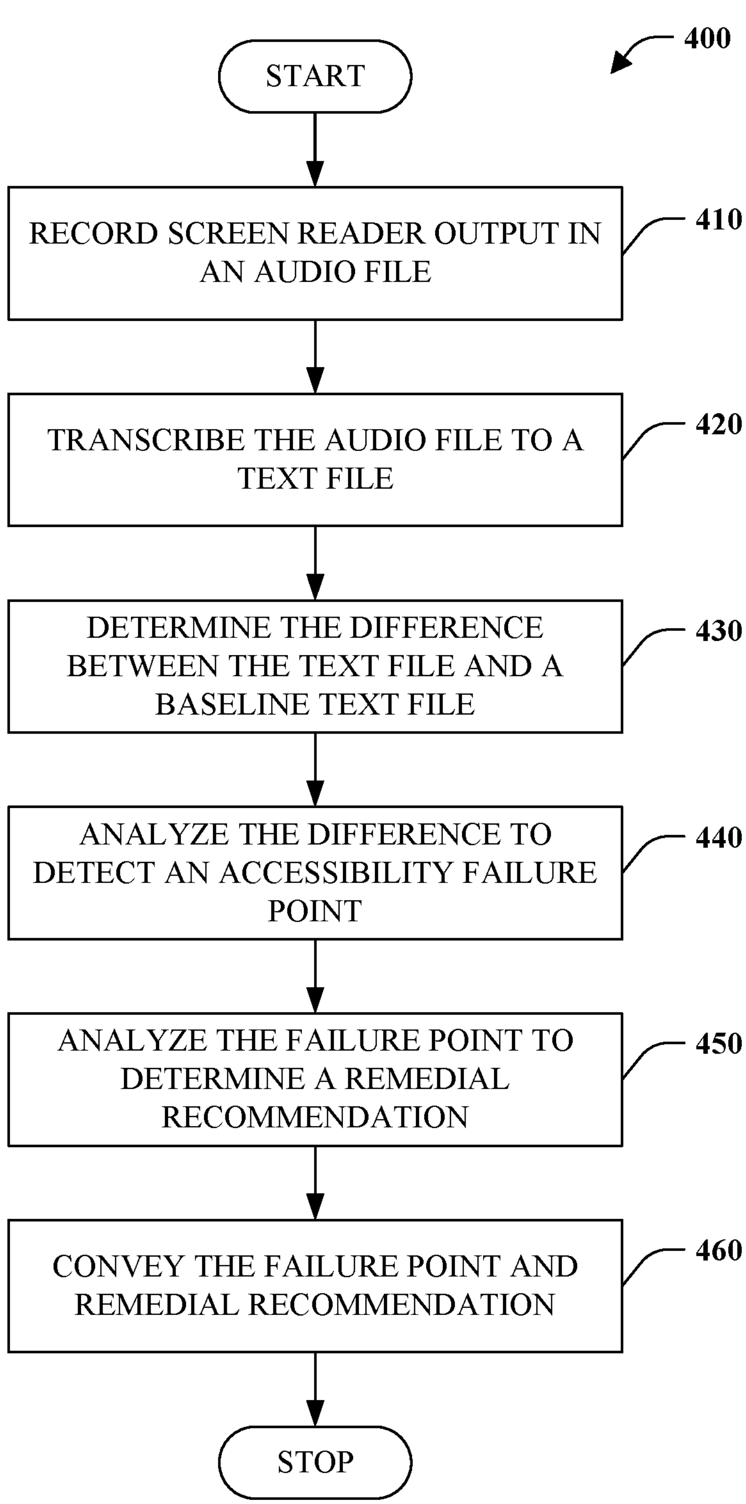
FIG. 4 is a flow chart diagram of a method of accessibility failure detection and remediation, in accordance with one or more embodiments described herein.
Figure 5:
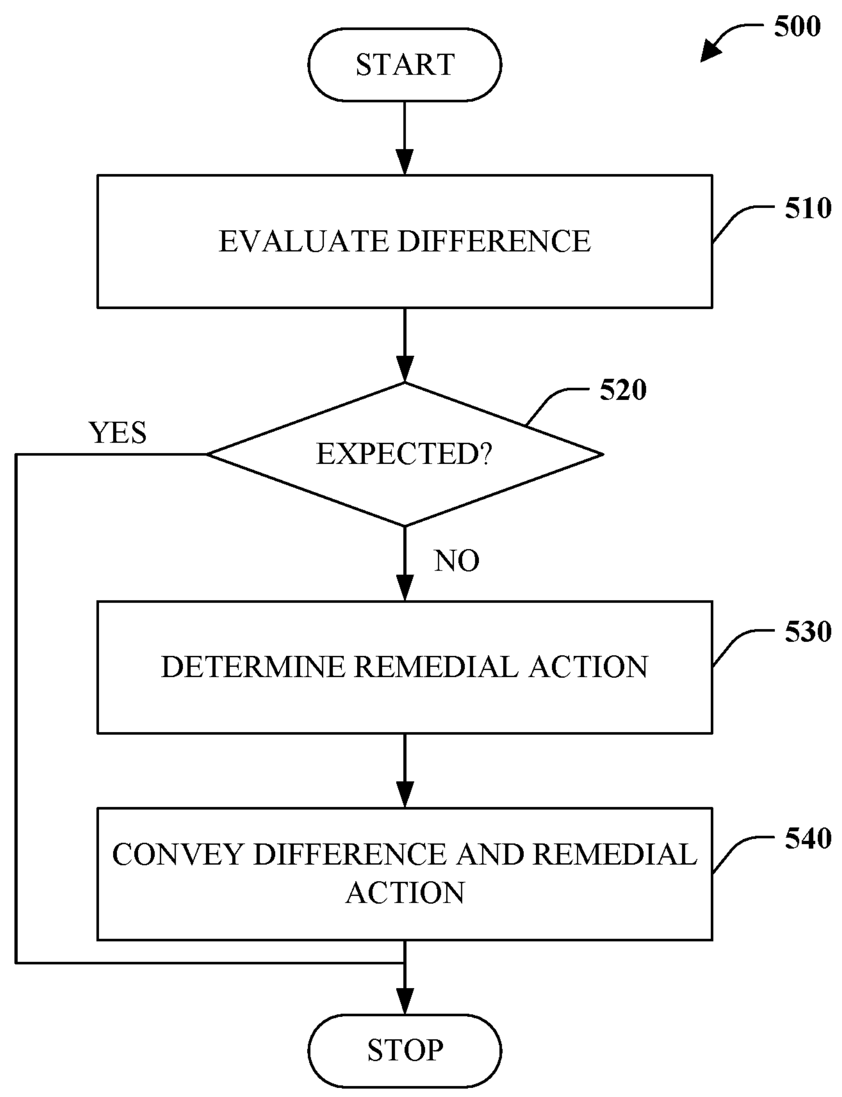
FIG. 5 is a flow chart diagram of a method of detecting and remedying accessibility failure, in accordance with one or more embodiments described herein.
Figure 6:
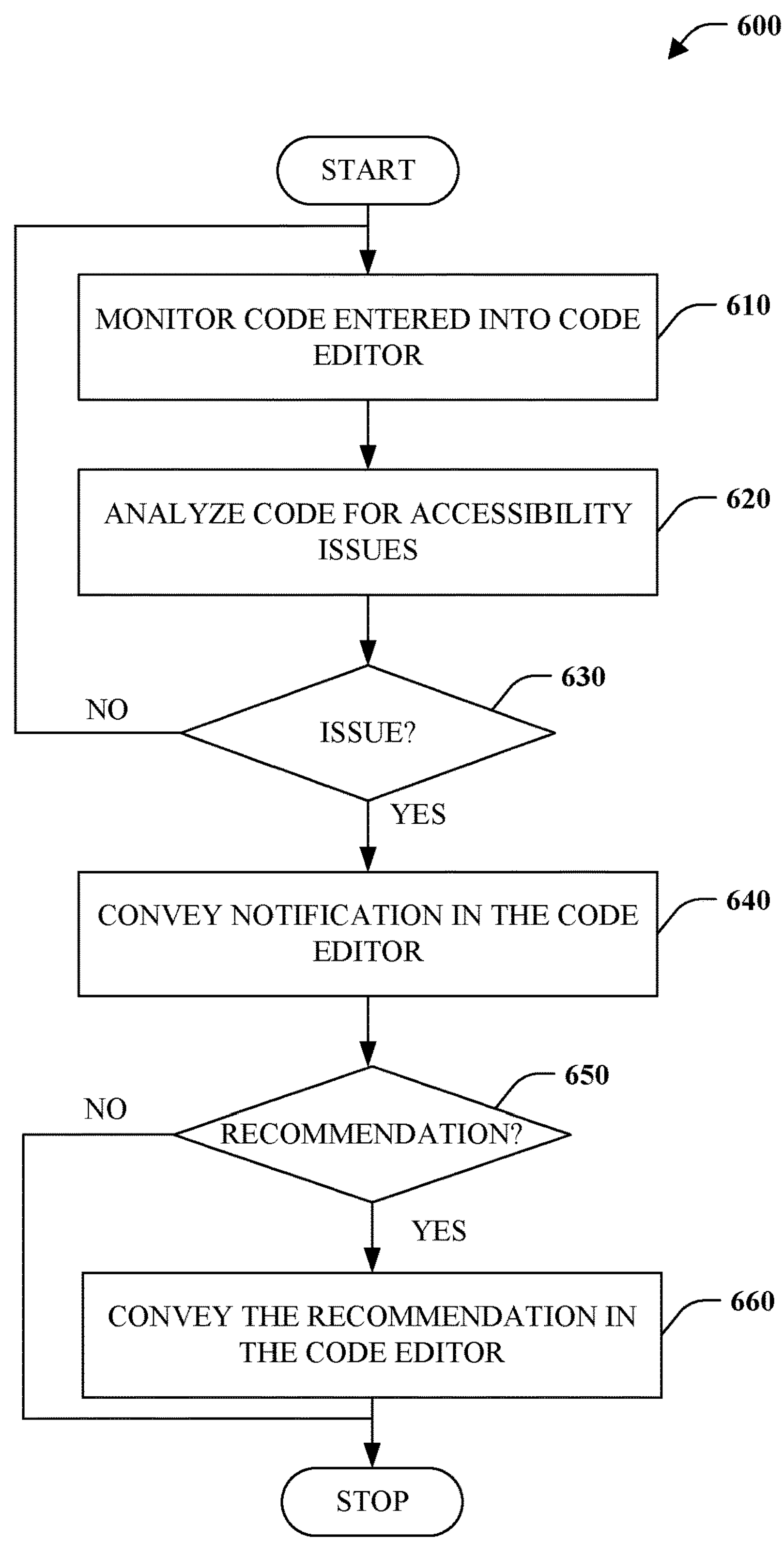
FIG. 6 is a flow chart diagram of a method of programming assistance, in accordance with one or more embodiments described herein.

In view of the example systems described above, methods that can be implemented in accordance with the disclosed subject matter will be better appreciated with reference to flow chart diagrams of FIGS. 4-6. While, for purposes of simplicity of explanation, the methods show and describe a series of blocks, it is to be understood and appreciated that the disclosed subject matter is not limited by the order of the blocks, as some blocks can occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 4, a flow chart diagram depicts a method 400 of accessibility failure detection and remediation. The method 400 can be performed by the example accessibility failure detection and remediation recommendation system 100 and components thereof illustrated in FIG. 1.

According to some embodiments, the method 400 is initiated in response to receiving a request for evaluating accessibility for a user interface of an updated version of a software application. In some examples, the request may include (1) the updated version of the software application, (2) a previous version of the software application, and (3) previous textual data corresponding to the previous version of the software application.

At reference numeral 410, the method 400 records screen reader output in an audio file. A screen reader can be invoked over software under test, such as a user interface. A screen reader is an assistive technology that aids visually impaired people, among others, by reading screen content aloud. The screen reader's speech output can be recorded and saved as an audio file. For example, audio output may be generated using a screen reader configured to process textual or visual data of the user interface and the updated version of the software application.

At numeral 420, the method transcribes the audio file to a text file. A speech-to-text application can be invoked with the text file as input. A speech-to-text program or application utilizes machine learning techniques to recognize and translate speech into text. The output of the speech-to-text application is a text file. For example, the method includes generating textual data, using speech recognition, by processing audio output from a screen reader based on the user interface (e.g., generating textual data by processing the audio output of the user interface using speech recognition).

In some examples, the textual data includes (1) a string of text and (2) one or more timestamps and generating the textual data may include generating, for each of a plurality of segments of the string of text, a corresponding timestamp representing a time at which each segment was textualized.

At reference numeral 430, the method 400 determines the difference between the content of the text file and a baseline text file. The baseline text file can correspond to a benchmark prior to changes and without accessibility failures. The text file can capture performance after one or more changes, updates, or alterations to software. Comparing the text file and the baseline text file can reveal differences associated with software modification. For example, the method may include comparing the textual data to the previous textual data to determine a plurality of feature differences present between the updated version and previous version of the software application.

At numeral 440, the method 400 analyzes the difference to detect an accessibility failure point. In one instance, the difference can correspond to a known accessibility failure and be identified as such. For example, if a difference corresponds to the repetition of a word within a predetermined time, such a difference can be deemed an accessibility failure point. Alternatively, the difference can share features with a known accessibility failure and be predicted to be an accessibility failure based on the feature. Additionally, differences in code can be informative in analyzing what is and is not an accessibility failure, given the modification of the code from a benchmark version.

In some examples, the accessibility failure point may be detected by processing the textual data and the plurality of feature differences using a first machine learning model to identify one or more feature differences of the plurality of feature differences corresponding to unintentional design changes. The method may include analyzing the one or more feature differences to identify a first feature difference corresponding to an accessibility failure point, wherein the accessibility failure point renders content in the user interface of the software application inaccessible to a user with a disability, such as a visually impaired user.

As referred to herein, a user with a disability may refer to a person who has a physical or mental impairment that substantially limits one or more major life activity. Persons with a disability also includes persons who have a record of having a physical or mental impairment that substantially limits one or more major life activities, and/or are regarded as having a physical or mental impairment. A physical impairment is any physiological disorder or condition, disfigurement, or anatomical loss that affects one or more bodily systems (including, but not limited to, neurological, musculoskeletal, respiratory, reproductive, cardiovascular, or endocrine systems). A mental impairment is any mental or psychological disorder, such as intellectual disability, mental illness, or specific learning disabilities.

As discussed herein, and as referred to herein, an accessibility failure point may refer to a specific area, such as a feature of a product that is not designed or built to be usable or easily usable by individuals with disabilities. For example, these failure points may make it difficult or impossible for users with disabilities to access and use content of the software application using the user interface and/or perform operations using the software application using the user interface. For example, some accessibility failure points may include those described herein and also may include lack of alternative text for images (e.g., for people with visual impairment), inadequate color contrast (e.g., for low vision individuals or for individuals with color-blindness), inadequate keyboard support, lack of audio descriptions (e.g., for hearing impaired users), and/or the like.

Disabilities such as visual impairment make it difficult or impossible for users to use software or user interfaces to access content or perform actions. For example, individuals with visual impairments such as low vision or blindness, may find it difficult to use applications relying heavily on visual cues. These individuals may require interfaces with larger text, high-contrast colors, and text-to-speech or screen-reading capabilities. Alternatively, or additionally, individuals with hearing impairments may struggle to use applications that rely heavily on audio cues, such as videos, podcasts, auditory prompts, etc. These individuals may require applications that offer an option for captions, transcripts, or visual notifications. Users with motor impairments, such as Parkinson's disease or cerebral palsy, may find it difficult to use user interfaces requiring precise movements, such as those necessitated by tapping, swiping, selecting small buttons, etc. These individuals may require a user interface having larger buttons, voice controls, or gesture-based controls. Similarly, users with cognitive impairments, such as dementia or autism, may have difficulty understanding or navigating phone applications. These individuals may need user interfaces that are simpler, or provide more visual cues.

For example, the first machine learning may be trained to identify the accessibility failure points. The method may include, for example, receiving a training dataset comprising (1) a plurality of textual data, (2) a plurality of feature differences, and (3) corresponding indications regarding whether a feature difference is associated with unintentional design changes, and training, based on the training dataset, the first machine learning model for identifying accessibility failure points to predict whether feature differences between versions of software applications correspond to unintentional design changes.

At reference numeral 450, the method 400 analyzes a failure point to determine a remedial recommendation. In one scenario, remediation can be predetermined and, for instance, available to be looked up in a database. For example, an identified failure "X" can be used as an index to look up remediation actions "A" and "B" in a table that remedy the failure "X." In another embodiment, the remediation action can be determined or predicted based on historical actions that have been used to remediate a failure with similar features. For instance, a machine learning model can be trained to predict remediation given code and text file differences. A predetermined threshold can be employed to identify a remediation strategy.

In some examples, in response to identifying the accessibility failure point, the method may include determining, based on (1) the first feature difference and (2) the updated version of the software application, one or more actions for removing the accessibility failure point. For example, determining one or more actions for removing the accessibility failure points may include retrieving, from a data structure, the one or more actions based on (1) the one or more feature differences and (2) the updated version of the software application.

In other examples, determining one or more actions for removing the accessibility failure points includes processing (1) the one or more feature differences and (2) the updated version of the software application using a second machine learning model for identifying actions for removing accessibility failure points. In some examples, the method also includes training the second machine learning model. For example, the method may further include receiving a training dataset comprising (1) the one or more feature differences, (2) the updated version of the software application, and (3) corresponding indications regarding whether a feature difference corresponds to unintentional or intentional design changes, and training, based on the training dataset, the first machine learning model for identifying accessibility failure points to predict whether feature differences between versions of software applications correspond to unintentional design changes.

At numeral 460, the method 400 conveys the failure point and remedial recommendation. Remediation strategy or actions can be transmitted for display to a user, or programmer, as a remedial recommendation. The user can implement the recommendation or dismiss the recommendation. In one instance, the remediation recommendation can provide an option to trigger automatic implementation of a recommended remediation strategy. For example, a command may be transmitted to a remote device for displaying the one or more actions for removing the accessibility failure points.

In some examples, the method may further include automatically performing the one or more actions for removing accessibility failure points and transmitting, to a remote device a notification of successful completion of the one or more actions.

FIG. 5 is a flow chart diagram of a method 500 of detecting and remedying accessibility failure. The method 500 can be performed by the analysis component 160 and components thereof, including the failure detection component 220 and the remediation recommendation component 230.

At reference numeral 510, the method 500 evaluates a difference between current and benchmark accessibility output. For example, the difference between a current text file and a benchmark text file capturing screen reader output can be evaluated. The method 500 can also evaluate current and benchmark codebase differences, capturing updates or other changes.

At numeral 520, the method 500 determines whether or not a difference in text files is expected. The determination can be made based on evaluating differences in the codebase. More specifically, code changes can be analyzed to determine expected or intentional changes versus unexpected or unintentional changes. For example, if the code is updated to include a new button, there is a difference in the codebases and the text files. However, the addition of the button is an expected or intentional change. Suppose that, in addition to the new button, the name of another button is repeated or not identified at all. In this case, the change is unexpected or unintentional. In one embodiment, a machine learning model can be trained to automatically classify changes or differences as expected or unexpected. If a difference is expected ("YES"), the method 500 terminates. If the difference is unexpected ("NO"), the method 500 continues at 530.

At 530, the method 500 determines remedial action. Root cause analysis can be performed to determine the basis of the unexpected difference. In one embodiment, a machine learning model can be employed to automatically identify the root cause based on historical data associated with differences and causes. The machine learning model can apply statistical learning techniques to identify patterns in data in one instance. Alternatively, a probabilistic model can be constructed to make inferences and predictions regarding a root cause. Such models can correspond to deep learning models, such as deep neural networks and convolutional neural networks, among others. After the root cause is identified, a remedial action, set of actions, or strategy can be determined to remedy the issue. Once a root cause is determined, actions needed to remedy the problem can be known. In this case, the actions can be looked up in a database for an identified root cause. Alternatively, a machine learning model can be employed to predict a remedial action from the root cause based on training data associated with historical actions that remedy root causes.

At reference numeral 540, the method 500 can convey the difference and remedial action to a user. For example, the difference and remedial action can be output in response to executing a tool to detect accessibility issues associated with software under test.

FIG. 6 is a flow chart diagram of a method 600 of programming assistance in accordance with an aspect of this disclosure. The method 600 can be implemented by the programming assistance system 300 of FIG. 3 to aid programmers in identifying and remedying potential accessibility issues.

At numeral 610, the method 600 monitors code entered into a code editor. The monitoring can be performed in real-time or near real-time as a programmer adds, deletes, or modifies software code in a code editor.

At reference 620, the method 500 analyzes the monitored code for accessibility issues or failures. In accordance with one embodiment, the method 500 can perform pattern matching in an attempt to reveal a potential accessibility issue. More specifically, a comparison can be made of input code to a pattern of code historically known to cause accessibility failures. In one instance, a machine learning model can be trained to perform such pattern matching automatically.

At numeral 630, the method 500 determines whether or not an accessibility issue has been detected or is likely present in the code. If an issue is not detected ("NO"), the method 600 continues at 610, where the code is monitored and analyzed. If an issue is detected ("YES"), the method continues at reference numeral 640.

At reference numeral 640, the method 600 conveys or otherwise transmits a notification by way of the code editor. In one embodiment, the code editor is notified of an accessibility issue and processes the notification in accordance with the code editor's setting. Alternatively, functionality can be integrated or tied into the code editor (e.g., plugin) and trigger notifying a programmer of a detected issue. For example, a squiggly line of a particular color can be used to highlight or distinguish code potentially associated with accessibility issues from other portions of code.

At numeral 650, the method determines whether or not to provide a recommendation to cure or mitigate a detected accessibility issue. The determination can be based on a setting specifying whether or not to provide a recommendation as well as an ability to determine corrective action. In one instance, the identified accessibility issue can correspond to a known remedial action. Alternatively, remedial action can be predicted or inferred automatically with a machine learning model trained on historical data associated with code, accessibility issues, and corrections. If the method 600 determines that no recommendation is to be provided ("NO"), the method 600 can terminate. Alternatively, if the method 600 determines that a recommendation will be provided ("YES"), the method continues at reference numeral 660.

At reference numeral 660, the recommendation is conveyed to the code editor for presentation or further processing. In one instance, a tooltip or menu can notify a programmer of the existence of a recommendation and provide a means for accessing the recommendation. In one scenario, the recommendation can be conveyed with a mechanism that automatically implements the suggestion in the code when activated.

This disclosure pertains to the technical problem of computer programming and accessibility testing. Accessibility testing can be done by a separate team that reports any accessibility failures to a programmer, who then has to modify a program and resubmit it to the team for testing. A technical solution is a programming tool that detects accessibility failures and provides remediation recommendations. The programmer tool can form part of an integrated development environment or correspond to a separate utility.

As used herein, the terms "component" and "system," as well as various forms thereof (e.g., components, systems, sub-systems . . . ) are intended to refer to a computer-related entity, either hardware, a combination of hardware and software, software, or software in execution. For example, a component can be, but is not limited to, being a process running on a processor, a processor, an object, an instance, an executable, a thread of execution, a program, and/or a computer. By way of illustration, both an application running on a computer and the computer can be a component. One or more components can reside within a process and/or thread of execution, and a component can be localized on one computer and/or distributed between two or more computers.

As used herein, the terms "infer" or "inference" generally refer to the process of reasoning about or inferring states of a system, a component, an environment, or a user from one or more observations captured by way of events or data, among other things. Inference can be employed to identify a context or an action or to generate a probability distribution over states, for example. An inference can be probabilistic. For example, computation of a probability distribution over states of interest can be based on a consideration of data or events. Inference can also refer to techniques employed for composing higher-level events from a set of events or data. Such inference can result in the construction of new events or new actions from a set of observed events or stored event data, whether or not the events are correlated in close temporal proximity, and whether the events and data come from one or several events and data sources.

Figure 7:
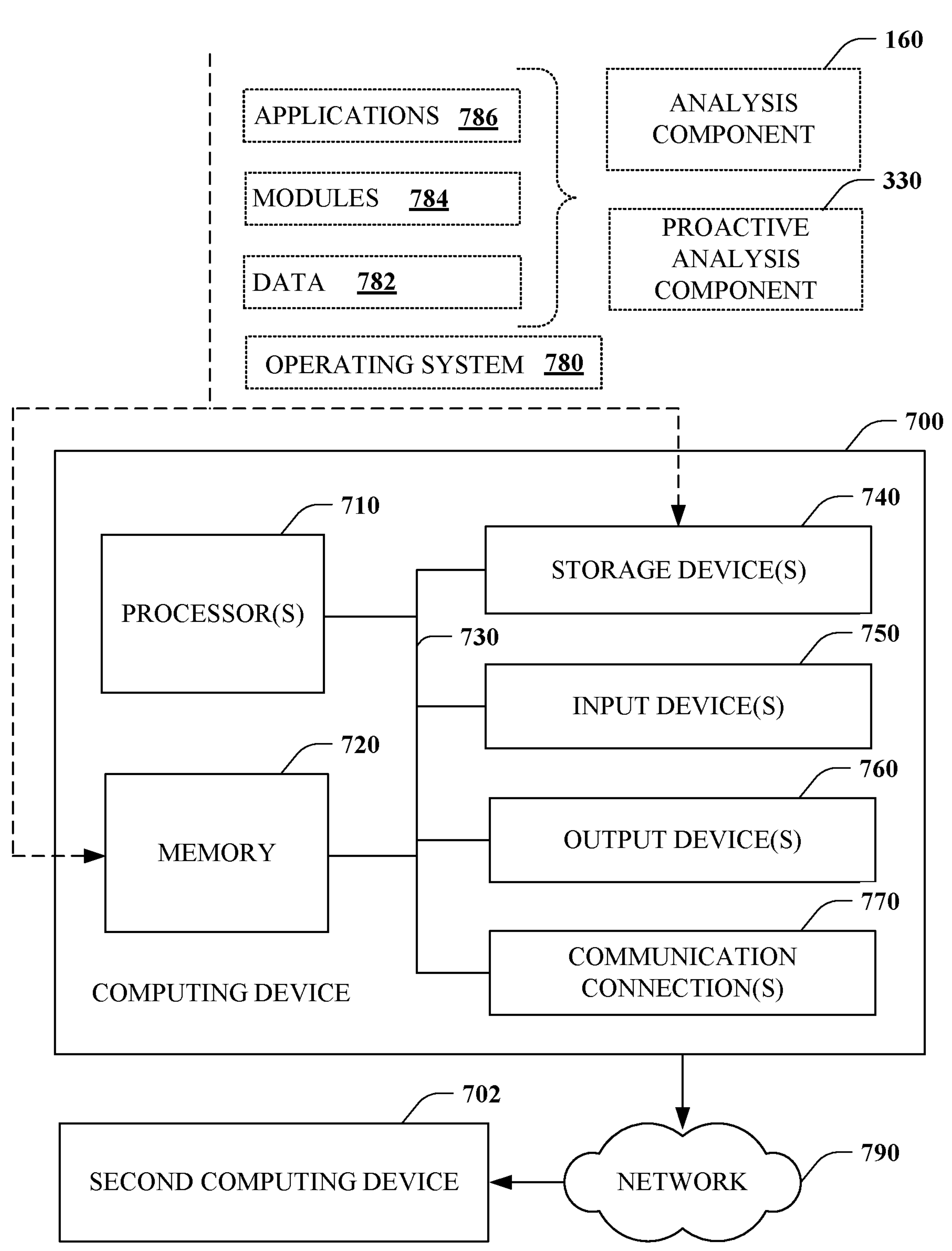
FIG. 7 is a block diagram illustrating a suitable operating environment for aspects of the subject disclosure, in accordance with one or more embodiments described herein.

To provide a context for the disclosed subject matter, FIG. 7, as well as the following discussion, are intended to provide a brief, general description of a suitable environment in which various aspects of the disclosed subject matter can be implemented. However, the suitable environment is solely an example and is not intended to suggest any limitation on the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, and data structures, among other things, which perform particular tasks and/or implement particular abstract data types. Moreover, those skilled in the art will appreciate that the above systems and methods can be practiced with various computer system configurations, including single-processor, multi-processor, or multi-core processor computer systems, mini-computing devices, server computers, as well as personal computers, hand-held computing devices (e.g., personal digital assistant (PDA), smartphone, tablet, watch, etc.), microprocessor-based or programmable consumer or industrial electronics, and the like. Aspects can also be practiced in distributed computing environments where tasks are performed by remote processing devices linked through a communications network. However, some, if not all, aspects of the disclosed subject matter can be practiced on standalone computers. In a distributed computing environment, program modules can be located in one or both of local and remote memory devices.

With reference to FIG. 7, illustrated is an example computing device 700 (e.g., desktop, laptop, tablet, watch, server, hand-held, programmable consumer or industrial electronics, set-top box, game system, compute node). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include processor(s) 710 coupled to memory 720, wherein the processor(s) 710 execute various computer-executable actions, instructions, and or components stored in the memory 720.

The processor(s) 710 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof, designed to perform the functions described herein. A general-purpose processor can be a microprocessor, but in the alternative, the processor can be any processor, controller, microcontroller, or state machine. The processor(s) 710 can also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 710 can be a graphics processor unit (GPU) that performs calculations concerning digital image processing and computer graphics.

The computing device 700 can include or otherwise interact with a variety of computer-readable media to facilitate control of the computing device to implement one or more aspects of the disclosed subject matter. The computer-readable media can be any available media accessible to the computing device 700 and includes volatile and nonvolatile media, and removable and non-removable media. Computer-readable media can comprise two distinct and mutually exclusive types: storage media and communication media.

Storage media includes volatile and nonvolatile, removable and non-removable media implemented in any method or technology to store information, such as computer-readable instructions, data structures, program modules, or other data. Storage media includes storage devices, such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD), etc.), and solid-state devices (e.g., solid-state drive (SSD), flash memory drive (e.g., card, stick, key drive)), or any other like media that store, as opposed to transmit or communicate, the desired information accessible by the computing device 700. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media.

The memory 720 and storage device(s) 740 are examples of computer-readable storage media. Depending on the configuration and type of computing device, the memory 720 can be volatile (e.g., RAM), nonvolatile (e.g., ROM, flash memory, etc.), or some combination of the two. By way of example, the basic input/output system (BIOS), including basic routines to transfer information between elements within the computing device 700, such as during start-up, can be stored in nonvolatile memory, while volatile memory can act as external cache memory to facilitate processing by the processor(s) 710, among other things.

The storage device(s) 740 include removable/non-removable, volatile/nonvolatile storage media for storing vast amounts of data relative to the memory 720. For example, storage device(s) 740 include, but are not limited to, one or more devices, such as a magnetic or optical disk drive, floppy disk drive, flash memory, solid-state drive, or memory stick.

Memory 720 and storage device(s) 740 can include, or have stored therein, operating system 780, one or more applications 786, one or more program modules 784, and data 782. The operating system 780 acts to control and allocate resources of the computing device 700. One or more applications 786 include one or both of system and application software and can exploit management of resources by the operating system 780 through one or more program modules 784 and data 782 stored in the memory 720 and/or storage device(s) 740 to perform one or more actions. Accordingly, one or more applications 786 can turn a general-purpose computer, for example, computing device 700, into a specialized machine according to the logic provided.

All or portions of the disclosed subject matter can be implemented using standard programming and/or engineering techniques to produce software, firmware, hardware, or any combination thereof, to control the computing device 700 to realize the disclosed functionality. By way of example and not limitation, all or portions of the analysis component 160 or the proactive analysis component 330 can be, or form part of, the one or more applications 786, and include one or more program modules 784 and data 782 stored in memory and/or storage device(s) 740 whose functionality can be realized when executed by one or more processor(s) 710. For example, one or both of the analysis component 160 or the proactive analysis component 330 can be incorporated within an integrated development environment or code editor.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors, as well as memory at least similar to the processor(s) 710 and memory 720, among other things. Conventional processors include a minimal amount of hardware and software and rely extensively on external hardware and software. By contrast, an SOC implementation of a processor is more powerful, as it embeds hardware and software therein that enable particular functionality with minimal or no reliance on external hardware and software. For example, the analysis component 160, the proactive analysis component 330, or functionality associated therewith, can be embedded within hardware in an SOC architecture.

The input device(s) 750 and output device(s) 760 can be communicatively coupled to the computing device 700. By way of example, the input device(s) 750 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 can be connected to the computing device 700 by way of wired connection (e.g., bus), wireless connection (e.g., Wi-Fi, Bluetooth), or a combination thereof.

The computing device 700 can also include communication connection(s) 770 to enable communication with at least a second computing device 702 utilizing a network 790. The communication connection(s) 770 can include wired or wireless communication mechanisms to support network communication. The network 790 can correspond to a personal area network (PAN), local area network (LAN), or a wide area network (WAN), such as the internet. In one instance, the computing device 700 can correspond to a first computing device executing the analysis component 160 or proactive analysis component 330. The second computing device 702 can correspond to a user computing device on which software under test is present. The analysis component 160 or proactive analysis component 330 can operate as a service accessible by other computing devices over the network 790.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to once embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method for evaluating accessibility of one or more software applications, the method comprising: receiving a request for evaluating accessibility for a user interface of an updated version of a software application, wherein the request comprises (1) the updated version of the software application, (2) a previous version of the software application, and (3) previous textual data corresponding to the previous version of the software application; generating audio output using a screen reader configured to process textual or visual data of the user interface and the updated version of the software application; generating textual data by processing the audio output of the user interface using speech recognition; comparing the textual data to the previous textual data to determine a plurality of feature differences present between the updated version and previous version of the software application; processing the textual data and the plurality of feature differences using a first machine learning model to identify one or more feature differences of the plurality of feature differences corresponding to unintentional design changes; analyzing the one or more feature differences to identify a first feature difference corresponding to an accessibility failure point, wherein the accessibility failure point renders content in the user interface of the software application inaccessible to a visually impaired user; and in response to identifying the accessibility failure point, determining, based on (1) the first feature difference and (2) the updated version of the software application, one or more actions for removing the accessibility failure point.

A2. The method of any of the preceding embodiments, further comprising transmitting, to a remote device, a command for displaying, at a remote device, the one or more actions for removing the accessibility failure point.

A3. The method of any of the preceding embodiments, wherein determining one or more actions for removing the accessibility failure point comprises retrieving, from a data structure, the one or more actions based on (1) the one or more feature differences and (2) the updated version of the software application.

A4. The method of any of the preceding embodiments, further comprising receiving a training dataset comprising (1) a plurality of textual data, (2) a plurality of feature differences, and (3) corresponding indications regarding whether a feature difference corresponds to unintentional or intentional design changes; and training, based on the training dataset, the first machine learning model for identifying accessibility failure points to predict whether feature differences between versions of software applications correspond to unintentional design changes.

A5. The method of any of the preceding embodiments, wherein determining one or more actions for removing the accessibility failure point comprises: processing (1) the one or more feature differences and (2) the updated version of the software application using a second machine learning model for identifying actions for removing the accessibility failure point.

A6. The method of any of the preceding embodiments, further comprising receiving a training dataset comprising (1) the one or more feature differences, (2) the updated version of the software application, and (3) corresponding actions that were performed to remove accessibility failure points; and training, based on the training dataset, the second machine learning model for identifying actions for removing accessibility failure points.

A7. The method of any of the preceding embodiments, wherein the textual data comprises (1) a string of text and (2) one or more timestamps and wherein generating the textual data comprises: generating, for each of a plurality of segments of the string of text, a corresponding timestamp representing a time at which each segment was textualized.

A8. The method of any of the preceding embodiments, further comprising automatically performing the one or more actions for removing accessibility failure points and transmitting, to a remote device, a notification of successful completion of the one or more actions.

A9. A tangible, non-transitory, machine-readable medium storing instructions that, when executed by a data processing apparatus, cause the data processing apparatus to perform operations comprising those of any of embodiments A1-A8.

A10. A system comprising: one or more processors and memory storing instructions that, when executed by the one or more processors, cause the processors to effectuate operations comprising those of any of embodiments A1-A8.

A11. A system comprising means for performing any of embodiments A1-A8.

A12. A system comprising cloud-based circuitry for performing any of embodiments A1-A8.

B1. A system, comprising: a processor coupled to a memory that stores instructions that, when executed by the processor, cause the processor to: invoke a screen reader on a user interface under test, wherein the screen reader produces an audio file; invoke a speech-to-text transcription service on the audio file of the screen reader that results in a text file; determine a difference between the text file and a text file of a prior version of the user interface under test; invoke a first machine learning model trained to identify an accessibility failure point from the text file and the difference; invoke a second machine learning model trained to recommend a fix for the accessibility failure point; and convey, for display on a display device, the accessibility failure point and recommended fix.

B2. The system of any of the preceding embodiments, wherein the machine learning model is trained to identify differences in timing as an accessibility failure point based on timestamps included in the text file.

B3. The system of any of the preceding embodiments, wherein the first machine learning model is trained to differentiate between an expected change and an accessibility failure point.

B4. The system of any of the preceding embodiments, wherein the prior version of the user interface under test is a benchmark.

B5. The system of any of the preceding embodiments, wherein the first machine learning model is trained to detect repetitious reading as an accessibility failure point.

B6. The system of any of the preceding embodiments, wherein the first machine learning model is trained to identify unreadable, hidden content.

B7. The system of any of the preceding embodiments, wherein the first machine learning model is trained to identify a mislabeled interactable element.

B8. The system of any of the preceding embodiments, wherein the instructions further cause the processor to prompt a user for input when a likelihood that an accessibility failure point produced by the first machine learning model satisfies a predetermined threshold.

B9. The system of any of the preceding embodiments, wherein the instructions further cause the processor to convey the difference on the display device.

B10. The system of any of the preceding embodiments, wherein the instructions further cause the processor to update the first machine learning model or the second machine learning in response to an accessibility test result.

B11. A method of software accessibility analysis comprising: executing, on a processor, instructions that cause the processor to perform operations, the operations comprising: capturing screen content of a user interface under test as speech in an audio file; performing speech-to-text transcription on the audio file to produce a text file that captures the screen content as text; determining a difference between the text file and a text file of a prior version of the user interface under test; invoking a first machine learning model trained to identify an accessibility failure point from the difference; and conveying, for display on a display device, the accessibility failure point.

B12. The method of any of the preceding embodiments, wherein the operations further comprise training the first machine learning model to identify differences in timing as an accessibility failure point based on timestamps included in the text file.

B13. The method of any of the preceding embodiments, wherein the operations further comprise training the first machine learning model to differentiate between an expected change and an unexpected change.

B14. The method of any of the preceding embodiments, wherein the operations further comprise invoking a second machine learning model trained to recommend a fix for the accessibility failure point.

B15. The method of any of the preceding embodiments, wherein the operations further comprise training the second machine learning model based on historical accessibility failures and resolutions.

B16. The method of any of the preceding embodiments, wherein the operations further comprise conveying the difference for display on the display device.

B17. A computer-implemented method, comprising: invoking a screen reader that captures screen content of a user interface under test as speech in an audio file; invoking a speech-to-text transcription service that transcribes the speech in the audio file to a text file; determining a difference between the text file and a text file of a prior version of the user interface under test; executing a first machine learning model that is trained to identify an accessibility failure point from the difference; executing a second machine learning model that is trained to determine a remedial action to remediate the accessibility failure identified by the first machine learning model; and transmitting, for display on a display device, the accessibility failure point and the remedial action.

B18. The computer-implemented method of any of the preceding embodiments, further comprising transmitting the difference for display on the display device.

B19. The computer-implemented method of any of the preceding embodiments, further comprising configuring the first machine learning model to identify an accessibility failure point when a likelihood that that accessibility failure point exists satisfies a predetermined threshold.

B20. The computer-implemented method of any of the preceding embodiments, further comprising training the first machine learning model to identify repetitious reading, a mislabeled interactable element, or a difference in timing as an accessibility failure point.

B21. A tangible, non-transitory, machine-readable medium storing instructions that, when executed by a data processing apparatus, cause the data processing apparatus to perform operations comprising those of any of embodiments B1-B20.

B22. A system comprising: one or more processors and memory storing instructions that, when executed by the one or more processors, cause the processors to effectuate operations comprising those of any of embodiments B1-B20.

B23. A system comprising means for performing any of embodiments B1-B20.

B24. A system comprising cloud-based circuitry for performing any of embodiments B1-B20.

What is claimed is:

1. A system for evaluating accessibility of one or more software applications, the system comprising:

one or more processors; and a non-transitory, computer readable medium comprising instructions that, when executed by the one or more processors, causes operations comprising:

monitoring code, entered into a code editor, for a user interface of an updated version of a software application;

generating audio output using a screen reader configured to process textual or visual data of the user interface and the updated version of the software application;

generating predicted textual data by processing the audio output of the user interface using speech recognition;

comparing the predicted textual data to previous textual data, corresponding to a previous version of the software application, to determine a plurality of feature differences present between the updated version of the software application and the previous version of the software application;

identifying that one or more feature differences, of the plurality of feature differences, are unintentional based on comparing the predicted textual data to the previous textual data;

using a machine learning model, trained on code identified with an accessibility failure and code without failure, to identify a code segment, of the code, corresponding to an accessibility failure point in the one or more feature differences based on the one or more feature differences being unintentional based on comparing the predicted textual data to the previous textual data, wherein the accessibility failure point renders content in the user interface inaccessible to a visually impaired user;

determining, based on (1) the code segment and (2) the updated version of the software application, one or more actions for removing the accessibility failure point; and providing a command for displaying, in the code editor, the one or more actions for removing the accessibility failure point.

2. The system of claim 1, wherein the instructions cause the one or more processors to perform operations comprising:

receiving a training dataset comprising indications regarding whether a feature difference corresponds to unintentional or intentional design changes; and training, based on the training dataset, the machine learning model or a different machine learning model for identifying that the one or more feature differences are unintentional.

3. The system of claim 1, wherein determining one or more actions for removing the accessibility failure point comprises:

processing (1) the one or more feature differences and (2) the updated version of the software application using another machine learning model for identifying actions for removing the accessibility failure point.

4. The system of claim 1, wherein the predicted textual data comprises (1) a string of text and (2) one or more timestamps and wherein generating the predicted textual data comprises:

generating, for each of a plurality of segments of the string of text, a corresponding timestamp representing a time at which each segment was textualized.

5. The system of claim 1, wherein the instructions cause the one or more processors to perform operations comprising:

automatically performing the one or more actions for removing the accessibility failure point; and transmitting, to a remote device, a notification of successful completion of the one or more actions.

6. A method, the method comprising:

receiving code, entered into a code editor, for a user interface of an updated version of a software application;

generating audio output using a screen reader configured to process textual or visual data of the user interface and the updated version of the software application;

generating predicted textual data by processing the audio output of the user interface using speech recognition;

comparing the predicted textual data to previous textual data, corresponding to a previous version of the software application, to determine a plurality of feature differences present between the updated version of the software application and the previous version of the software application;

identifying one or more feature differences, of the plurality of feature differences, that are unintentional design changes based on comparing the predicted textual data to the previous textual data;

using a machine learning model, trained on code identified with an accessibility failure and code without failure, to identify a code segment, of the code, corresponding to an accessibility failure point in the one or more feature differences, wherein the accessibility failure point renders content in the user interface inaccessible to a visually impaired user; and determining, based on (1) the code segment and (2) the updated version of the software application, one or more actions for removing the accessibility failure point.

7. The method of claim 6, further comprising transmitting, to a remote device, a command for displaying, at a remote device, the one or more actions for removing the accessibility failure point.

8. The method of claim 6, wherein determining one or more actions for removing the accessibility failure point comprises retrieving, from a data structure, the one or more actions based on (1) the one or more feature differences and (2) the updated version of the software application.

9. The method of claim 6, further comprising:

receiving a training dataset comprising indications regarding whether a feature difference corresponds to unintentional or intentional design changes; and training, based on the training dataset, the machine learning model or a different machine learning model for identifying that the one or more feature differences are unintentional.

10. The method of claim 6, wherein determining one or more actions for removing the accessibility failure point comprises:

processing (1) the one or more feature differences and (2) the updated version of the software application using a different machine learning model for identifying actions for removing the accessibility failure point.

11. The method of claim 10, further comprising:

receiving a training dataset comprising (1) the one or more feature differences, (2) the updated version of the software application, and (3) corresponding actions that were performed to remove accessibility failure points; and training, based on the training dataset, the different machine learning model for identifying actions for removing accessibility failure points.

12. The method of claim 6, wherein the predicted textual data comprises (1) a string of text and (2) one or more timestamps and wherein generating the predicted textual data comprises:

generating, for each of a plurality of segments of the string of text, a corresponding timestamp representing a time at which each segment was textualized.

13. The method of claim 6, further comprising:

automatically performing the one or more actions for removing accessibility failure points; and transmitting, to a remote device, a notification of successful completion of the one or more actions.

14. One or more non-transitory, computer readable media comprising instructions that, when executed by one or more processors, causes operations comprising:

receiving code, entered into a code editor, for a user interface of an updated version of a software application;

comparing predicted textual data associated with the updated version of the software application to previous textual data, associated with a previous version of the software application, to determine a plurality of feature differences present between the updated version of the software application and the previous version of the software application;

using one or more machine learning models, including a machine learning model trained on code identified with an accessibility failure and code without failure, to identify one or more feature differences, of the plurality of feature differences, that are unintentional based on the predicted textual data being compared to the previous textual data and identify a code segment, of the code, corresponding to an accessibility failure point in the one or more feature differences, wherein the accessibility failure point renders content in the user interface inaccessible to a visually impaired user; and providing, in the code editor, information based on identifying the code segment corresponding to the accessibility failure point.

15. The one or more non-transitory, computer readable media of claim 14, wherein the operations further comprise:

generating audio output using a screen reader configured to process textual or visual data of the user interface and the updated version of the software application; and generating the predicted textual data by processing the audio output of the user interface using speech recognition.

16. The one or more non-transitory, computer readable media of claim 15, wherein the predicted textual data comprises (1) a string of text and (2) one or more timestamps, and wherein generating the predicted textual data comprises:

generating, for each of a plurality of segments of the string of text, a corresponding timestamp representing a time at which each segment was textualized.

17. The one or more non-transitory, computer readable media of claim 14, wherein the operations further comprise: determining one or more actions removing the accessibility failure point.

18. The one or more non-transitory, computer readable media of claim 14, wherein the operations further comprise: receiving a training dataset comprising (1) a plurality of textual data, (2) a plurality of feature differences, and (3) corresponding indications regarding whether a feature difference corresponds to unintentional or intentional design changes; and training, based on the training dataset, at least one of the one or more machine learning models.

19. The one or more non-transitory, computer readable media of claim 14, wherein the operations further comprise: processing (1) the one or more feature differences and (2) the updated version of the software application using a different machine learning model for identifying actions for removing the accessibility failure point.

20. The one or more non-transitory, computer readable media of claim 19, wherein the operations further comprise: receiving a training dataset comprising (1) the one or more feature differences, (2) code of the updated version of the software application, and (3) corresponding actions that were performed to remove the accessibility failure point; and training, based on the training dataset, the different machine learning model for identifying the actions for removing the accessibility failure point.

* * * * *